(12) United States Patent
Seeger et al.

(10) Patent No.: US 12,483,556 B2
(45) Date of Patent: Nov. 25, 2025

(54) METHOD FOR LOGGING AN AUTHORIZED USER IN TO A DEVICE, IN PARTICULAR TO A DEVICE FOR A POWER GENERATION PLANT, AND POWER GENERATION PLANT WITH DEVICE

(71) Applicant: SMA Solar Technology AG, Niestetal (DE)

(72) Inventors: Marek Seeger, Bovenden (DE); Stefan Börger, Kassel (DE); Dirk Schlote, Kassel (DE); Jens Klein, Göttingen (DE); Raimund Thiel, Bad Zwesten (DE); Mirko Wischer, Bad Hersfeld (DE); Ingo Hanke, Göttingen (DE)

(73) Assignee: SMA Solar Technology AG, Niestetal (DE)

( * ) Notice: Subject to any disclaimer, the term of this patent is extended or adjusted under 35 U.S.C. 154(b) by 65 days.

(21) Appl. No.: 18/483,544

(22) Filed: Oct. 10, 2023

(65) Prior Publication Data
US 2024/0039915 A1    Feb. 1, 2024

Related U.S. Application Data

(63) Continuation of application No. PCT/EP2022/059483, filed on Apr. 8, 2022.

(30) Foreign Application Priority Data

Apr. 13, 2021   (DE) .................... 10 2021 109 253.1

(51) Int. Cl.
*H04L 9/40*   (2022.01)
*H04L 9/08*   (2006.01)
*H04L 9/32*   (2006.01)

(52) U.S. Cl.
CPC ........ *H04L 63/0884* (2013.01); *H04L 9/0838* (2013.01); *H04L 9/3226* (2013.01);
(Continued)

(58) Field of Classification Search
CPC . H04L 63/0884; H04L 9/0838; H04L 9/3226; H04L 63/061; H04L 63/166; H04L 2463/082
See application file for complete search history.

(56) References Cited

U.S. PATENT DOCUMENTS 9,191,203 B2 *  11/2015  Rooyakkers ............ H04L 9/083
10,104,077 B1   10/2018  Irwan et al.
(Continued)

FOREIGN PATENT DOCUMENTS

DE    102006007793 B3    5/2007
DE    102019131745 A1    6/2020
WO    2019070475 A1    4/2019

OTHER PUBLICATIONS

International Search Report dated Jul. 26, 2022 in connection with PCT/EP2022/059483.

*Primary Examiner* — Techane Gergiso
(74) *Attorney, Agent, or Firm* — Eschweiler & Potashnik, LLC

(57) ABSTRACT

A method for logging a user into a device for a power generation plant, using a service gateway, wherein an access authorization of the user for the device is stored on the service gateway, is disclosed. The method includes authenticating the user on the service gateway, sending a device access request using an access device from the user to the service gateway specifying an identifier of the device for the power generation plant, and comparing a device secret (Continued)

stored on the service gateway with a copy of the device secret generated using the device secret and stored on the device, via an SRP protocol.

13 Claims, 2 Drawing Sheets

(52) U.S. Cl.
CPC .......... H04L 63/061 (2013.01); H04L 63/166 (2013.01); *H04L 2463/082* (2013.01)

(56) References Cited

U.S. PATENT DOCUMENTS

| | | | | |
|---|---|---|---|---|
| 10,536,436 | B1* | 1/2020 | Barbour | H04L 63/0838 |
| 2004/0268150 | A1* | 12/2004 | Aaron | H04L 63/0263 726/11 |
| 2007/0266423 | A1* | 11/2007 | Tehee, Jr. | F03D 7/028 726/4 |
| 2010/0058452 | A1* | 3/2010 | Vincent | H04L 9/3226 726/7 |
| 2011/0167477 | A1* | 7/2011 | Piccirillo | H04L 9/3271 726/4 |
| 2013/0245843 | A1* | 9/2013 | Bhageria | H04L 67/1001 700/287 |
| 2013/0290705 | A1* | 10/2013 | Lovmand | H04L 9/3268 713/156 |
| 2014/0125125 | A1* | 5/2014 | Wyatt | G06Q 50/06 307/18 |
| 2015/0032275 | A1* | 1/2015 | Bhageria | G06Q 10/04 700/287 |
| 2016/0014078 | A1* | 1/2016 | Schrecker | H04L 63/20 726/12 |
| 2017/0289191 | A1* | 10/2017 | Thioux | H04L 63/1441 |
| 2017/0363065 | A1 | 12/2017 | Jakobs et al. | |
| 2019/0312856 | A1* | 10/2019 | Friel | H04L 63/0838 |
| 2020/0295933 | A1* | 9/2020 | Link, II | H04W 4/70 |
| 2022/0116384 | A1 | 4/2022 | Bartsch et al. | |

* cited by examiner

METHOD FOR LOGGING AN AUTHORIZED USER IN TO A DEVICE, IN PARTICULAR TO A DEVICE FOR A POWER GENERATION PLANT, AND POWER GENERATION PLANT WITH DEVICE

CROSS REFERENCE TO RELATED APPLICATIONS

This application is a continuation of International Patent Application Number PCT/EP2022/059483, filed on Apr. 8, 2022, which claims priority to German Patent Application number 10 2021 109 253.1, filed on Apr. 13, 2021, and is hereby incorporated by reference in its entirety.

FIELD

The disclosure relates to a method for logging an authorized user in to a device, in particular to a device for a power generation plant, and a power generation plant.

BACKGROUND

Power generation plants can have communication interfaces which enable remote access via data connections, e.g. via the Internet, to devices of the power generation plant. Data connections of this type can be used e.g. by service technicians of the power generation plant to carry out e.g. remote maintenance on the power generation plant.

The SRP protocol (SRP: Secure Remote Password) relates to an authentication and key agreement method in which one communication partner is authenticated with another. The key agreement of the communication partners relates to a session key which secures a communication session between the communication partners. The session key itself is not transmitted between the communication partners.

Document DE10 2006 007 793 B3 discloses an access method for a user in which an authentication of the user is performed via a diversion to a gateway which forwards the user to the target device once the authentication is completed. Document DE 10 2019 131 745 A1 further indicates a method for setting up a secure connection between a microcontroller and a network computer through the use of digital certificates.

SUMMARY

The disclosure is directed to secure access, in particular remote access, via data connections to a device, in particular a device for a power generation plant.

In a method for logging an authorized user in to a device, in particular to a device for a power generation plant, by means of a service gateway, an access authorization of the user for the device is stored on the service gateway. The method comprises:
  authenticating the user on the service gateway,
  sending a device access request by the user to the service gateway with specification of an identifier of the device,
  comparing a device secret stored on the service gateway with a copy of the device secret stored on the device via an SRP protocol. The comparison is performed via a data connection between an access device of the user and the service gateway, and via a data connection between the access device of the user and the device.
  If the comparison is successful, a session key is agreed between the device and the service gateway via the SRP protocol, and
  the user logs in to the device.

In contrast to a method with an SRP protocol with precisely two communication partners, the method is implemented here with three communication partners: a device, a service gateway and an access device of the user.

With the method, a person, for example, a service technician, can be provided with manipulation-proof access to a device by logging in to a service gateway on which the device, for example, along with a multiplicity of other devices, is registered. This is possible without the need to perform an individual authentication of the user directly on the device, for example, by means of device-specific login data. It is further possible to carry out the method without a direct connection between the service gateway and the device. It is possible for a multiplicity of devices to be registered on the service gateway. No data are exchanged here which subsequently allow or simplify access by an unauthorized user to the device.

In the case of a device for a power generation plant, the device can be, e.g., a controller or an inverter of the power generation plant, and the service gateway can be provided by the operator of the power generation plant and/or by the manufacturer of the controller or the inverter and/or a service provider offering, e.g., remote maintenance.

In one embodiment, manipulations, inter alia, by means of the following attack variants, can be prevented:
  interception of the data communication,
  modification of the transmitted data,
  repeated playback of recorded data,
  simulation of falsified identity of communication partners by means of collected data, and/or
  misuse of collected data, even during permitted use, by the user.

The SRP protocol enables secure agreement, for example, common generation, of the session key after the service gateway has provided proof of ownership of a device secret to the device which is in possession of a copy of a device secret. The service gateway can be authenticated at least unilaterally on the device by means of this proof of ownership of the device secret. It is conceivable, but not necessary, for the device also to provide proof of ownership of the copy of the device secret to the service gateway. Instead, only requests and responses to the requests are exchanged in the comparison, from which at least the device can recognize that the service gateway is in possession of the device secret. The device secret or its copy cannot be inferred here from the exchanged information.

Furthermore, neither the agreed session key nor parts of it are likewise transmitted during the agreement of a session key. Instead, only information indicating how the session key is to be generated is exchanged for the agreement of the session key, for example, by referring to contents of the device secret or its copy. The session key is then generated with the same result on the device and on the service gateway independently from one another. Proof of ownership of the secrets and agreement of the session key can be performed successively or jointly.

In one embodiment, the device secret exists only once on the service gateway. It is used to generate, in one example, a—device-specific—copy of the device secret which is then stored on the device. As a result, with the SRP protocol, no one can pretend to be the service gateway in relation to the device, even if the copy is compromised. The device secret copy is generated uniquely from the device secret by means of a mathematical method, wherein the device secret cannot be derived from the device secret copy using any known mathematical method. With the SRP protocol, the owner of the copy can nevertheless check whether the communication partner is also in possession of the device secret which generates the copy without the owner of the copy himself having to know this device secret. However, it is also not excluded that the copy is an exact replica of the device secret, even if this reduces the security of the method.

In one embodiment, the session key forms the basis of a symmetric encryption in which the session key is used for both encryption and decryption. Other ways of securing the session between the device and the service gateway using the session key are similarly conceivable.

It is also conceivable in one embodiment for the session key to contain information relating to the scope of the access authorization of the user. Access via the agreed session key can then be limited according to the access authorization information contained therein. This enables management of the user rights for the device via the service gateway. The information can then be integrated into the negotiated session key with the SRP protocol, for example, by negotiating session keys for different user rights models, but, in one embodiment, only the session key which matches the access authorization of the user is transmitted from the service gateway to the user. Alternatively, user rights can be managed on the device as well.

The device, the service gateway and the access device of the user are, in one embodiment, located at locations apart from one another. Remote access of the user to the device can therefore be provided by means of the method using the service gateway.

However, in order to increase security, in one embodiment the data connection is set up between the user and the device via a connection having a spatially severely limited range, for example, via a radio link such as NFC (Near Field Communication), Bluetooth or Zigbee.

In one embodiment, the method also comprises:
transmitting the session key from the service gateway to the access device of the user, preferably via an encrypted and authenticated communication connection, insofar as an authorization of the user is stored on the service gateway, and
the user accessing the device using the session key. On completion of the authorization and authentication, the session key is therefore transmitted from the service gateway to the access device of the user. The following further communication takes place between the access device of the user and the device using the session key.

The authorization of the user on the service gateway can be defined, e.g., on the basis of features of the access device of the user, for example, device serial numbers, device types of further features. New users or new access devices can be registered on the service gateway and access rights can be granted for e.g. devices, e.g. according to the four-eyes principle.

In one embodiment of the method, the user determines the identifier of the device using a query on the device via the data connection between the access device of the user and the device.

In one embodiment of the method, the device secret is stored in the database of the service gateway. The copy of the device secret can be generated during the manufacture of the device in one embodiment, and the copy of the device secret can be stored on the device and the device secret itself can be stored in the database of the service gateway. Alternatively or additionally, the copy of the device secret can be generated during a software update of the device from a device secret stored in the service gateway, and the copy of the device secret can be stored on the device and the device secret itself can be stored in the service gateway, for example, in the database of the service gateway.

In one embodiment, the authentication of the user on the service gateway comprises a check to determine whether the number of access requests made in a given time period exceeds a maximum number. Alternatively or additionally, the authentication of the user on the service gateway comprises a two-factor authentication of the user. A login and all further activities of the user on the device and/or the service gateway during the authentication and authorization can be recorded and monitored. The number of permitted authentications of the user on the device can be limited, in one embodiment, with reference to time segments, e.g. day, month, year.

In one embodiment of the method, the data connection between the access device of the user and the service gateway and/or the data connection between the access device of the user and the device is set up via an encrypted and authenticated TLS (Transport Layer Security) connection using a cipher suite ensuring Perfect Forward Secrecy. The security of the method is further improved as a result.

In one embodiment of the method, the device is a device for a power generation plant, for example, a controller and/or an inverter of the power generation plant. For a device of this type, following successful login of the user on the device, the method can comprise:
reading historical data of the power generation of the power generation plant,
reading parameters of the power generation of the power generation plant, and/or
modifying parameters of the power generation of the power generation plant.

In one embodiment of the method, the parameters are modified depending on the historical data. The parameters can thereby be adjusted, e.g., according to local circumstances of the power generation plant which can be obtained from the historical data.

In one embodiment of the method, the parameters are modified depending on data that are received from the device via the data connection between the access device of the user and the device. The parameters can be thereby adjusted, e.g., externally by the operator of the power generation plant.

In one embodiment of the method, the historical data are transmitted from the device by the data connection between the access device of the user and the device. As a result, for example, the operator of the power generation plant can be enabled to merge historical data centrally.

A power generation plant comprises a device on which a copy of a device secret is stored, wherein the copy of the device secret has been generated using a device secret. The device is configured to enable the comparison of the copy of the device secret stored on the device with a remotely stored device secret via an SRP protocol, wherein the device is designed to enable a user to log in to the device via the SRP protocol if the comparison is successful.

BRIEF DESCRIPTION OF THE FIGURES

The disclosure is illustrated below with reference to figures, in which.

DETAILED DESCRIPTION

Figure 1:
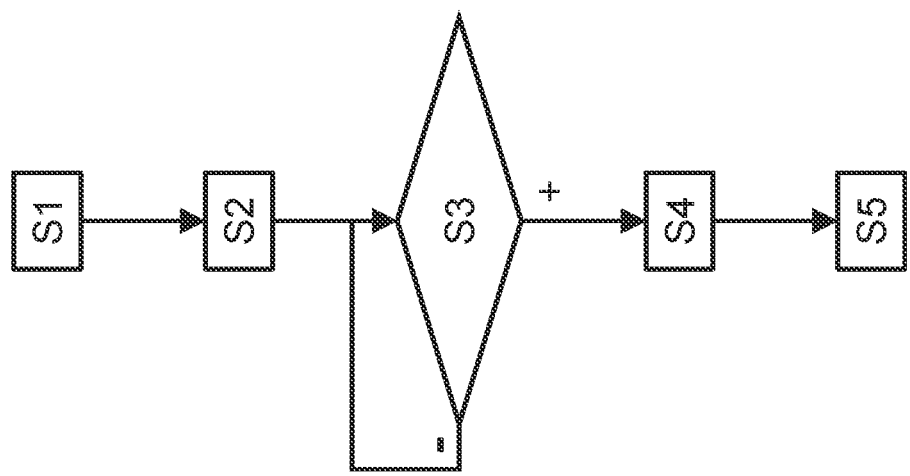
FIG. 1 shows an embodiment of a method for access of an authorized user to a device.
Figure 2:
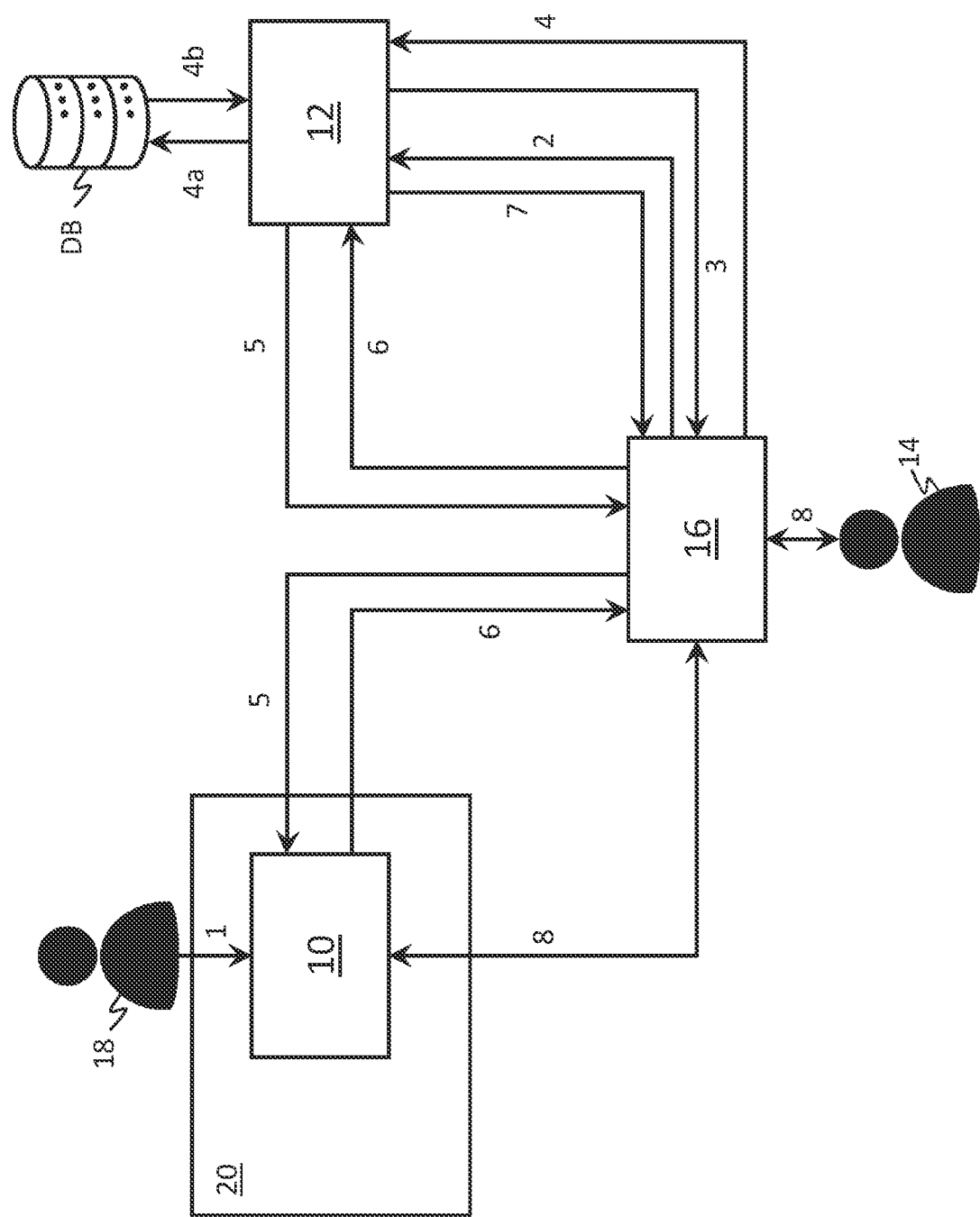
FIG. 2 shows schematically communication links between communication partners for implementing an access method.

An example embodiment of a method for logging an authorized user 14 in to a device 10 is shown in FIG. 1, using the reference numbers from FIG. 2. The method is carried out by means of a service gateway 12 on which an access authorization of the user 14 for the device 10 is stored. The method comprises the following acts:

S1) authenticating the user 14 on the service gateway 12;

S2) the user 14 sending a device access request to the service gateway 12 specifying an identifier of the device 10;

S3) comparing a device secret stored on the service gateway 12 with a copy of the device secret generated using the device secret and stored on the device 10, via an SRP protocol, wherein the comparison is carried out via a data connection between an access device 16 of the user 14 and the service gateway 12, and a data connection between the access device 16 of the user 14 and the device 10. In one embodiment, the data connection between the access device of the user and the service gateway and/or the data connection between the access device of the user and the device is set up via an encrypted and authenticated TLS connection using a cipher suite ensuring Perfect Forward Secrecy Following a successful comparison (path "+"), acts S4) and S5) are carried out:

S4) agreeing a session key between the device 10 and the service gateway 12 (e.g., using a Diffie-Hellman algorithm or other known algorithm), and S5) the user 14 logging in to the device 10 via the SRP protocol.

According to the SRP protocol, the device secret or the copy of the device secret is not transmitted via the data connections, but only test queries are exchanged and answered between the device 10 and the service gateway 12. This corresponds to a so called "zero-knowledge method".

The device secret can be stored e.g. in a database DB of the service gateway 12. The copy of the device secret can be generated during the manufacture of the device 10, and the copy of the device secret can be stored on the device 10 and the device secret itself can be stored in the database DB of the service gateway. Alternatively or additionally, the copy of the device secret can be generated from a device secret during a software update of the device 10, and the copy of the device secret can be stored on the device 10 and the device secret itself can be stored in the service gateway 12, for example, in the database DB of the service gateway 12. The device secret can be generated individually for each device and can be stored in the database DB, or the same device secret is stored in the database DB and used for a multiplicity of devices or for all devices. If the same device secret is used for a plurality of devices, the generation of the copy of the device secret can be individualized instead.

A device 10, a service gateway 12 and a user 14 are shown in FIG. 2. The user 14 sets up data connections via an access device 16, e.g. via the Internet. The device 10 is part of a power generation plant 20 that is operated by an operator. A person 18 who can be e.g. the operator of the power generation plant 20 or the owner of the power generation plant grants access permission, i.e. authorization, with operation 1 shown in FIG. 2 for a user 14 to the device 10. The user 14 thus becomes the authorized user 14.

An authentication, for example, a two-factor authentication, of the user 14 on the service gateway 12 is performed with operation 2 shown in FIG. 2. The login data, i.e. the authentication, are checked by the service gateway 12 with operation 3 shown in FIG. 2 and, in the event of a confirmation, positive feedback is sent to the access device 16 of the user 14. Act S1) from FIG. 1 can therefore comprise operations 1, 2, and 3 shown in FIG. 2.

With operation 4 shown in FIG. 2, the user 14 requests access to a device 10 from the service gateway 12. The device 10 can be identified e.g. on the basis of the serial number. The service gateway 12 checks the authorization of the user 14 to access the device 10. Operation 4 shown in FIG. 2 therefore corresponds to act S2) from FIG. 1.

In an operation 4a shown in FIG. 2, the service gateway 12 requests the device secret 12 in the database DB, e.g. with the serial number of the device 10. In operation 4b shown in FIG. 2, the device secret is returned from the database DB to the service gateway 12.

In operation 5 shown in FIG. 2, the service gateway 12 is authenticated on the device 10 with the SRP protocol. The device secret is checked here, i.e. a check is carried out in the device on the basis of the copy of the device secret to determine whether the device secret is present in the service gateway 12. As shown in FIG. 2, the authentication is performed via a two-stage communication, service gateway 12 to access device 16, and access device 16 to device 10. Operation 5 therefore corresponds to act S3) from FIG. 1.

In the event of a confirmation, the session key is negotiated in operation 6. As shown in FIG. 2, this negotiation takes place via a two-stage communication, device 10 to access device 16, and access device 16 to service gateway 12. The session key is calculated at the same time in the device and in the service gateway. The session key is not transmitted. Operation 6 therefore corresponds to act S4) from FIG. 1.

In operation 7 shown in FIG. 2, the session key is transmitted to the access device 16 of the user 14. Operation 8 of FIG. 2 denotes the further communication directly between the access device 16 of the user 14 and the device 10 using the session key. Act S5) from FIG. 1 can therefore comprise operations 7 and 8.

What is claimed is:

1. A method for logging a user into a device for a power generation plant, using a service gateway, wherein an access authorization of the user for the device is stored on the service gateway, comprising:

authenticating the user on the service gateway, sending a device access request using an access device from the user to the service gateway specifying an identifier of the device for the power generation plant, comparing a device secret stored on the service gateway with a copy of the device secret generated using the device secret and stored on the device, via an SRP protocol, wherein the comparison is carried out via a data connection between the access device of the user and the service gateway, and a data connection between the access device of the user and the device for the power generation plant, wherein, when the comparison is successful, a session key is agreed between the device and the service gateway via the SRP protocol, and the user logs into the device using the access device, wherein the data connection between the access device of the user and the service gateway and/or the data connection between the access device of the user and the device is set up via an encrypted and authenticated TLS connection using a cipher suite ensuring Perfect Forward Secrecy.

2. The method as claimed in claim 1, further comprising:
transmitting the session key from the service gateway to the access device of the user, when an authorization of the user is stored on the service gateway, and
the user accessing, via the access device, the device using the session key.

3. The method as claimed in claim 1, wherein the user determines the identifier of the device using a query of the device via the data connection between the access device of the user and the device.

4. The method as claimed in claim 1, wherein a transmission of the agreed session key between the service gateway and the device is avoided.

5. The method as claimed in claim 1, further comprising generating the copy of the device secret during a manufacture of the device, storing the copy of the device secret on the device, and storing the device secret in a database (DB) of the service gateway.

6. The method as claimed in claim 1, further comprising generating the copy of the device secret during a software update of the device from a device secret generated in the service gateway, and storing the copy of the generated device secret on the device.

7. The method as claimed in claim 6, further comprising storing the generated device secret in a database (DB) of the service gateway.

8. The method as claimed in claim 1, wherein the authentication of the user comprises a check to determine whether a number of access requests made in a given time period exceeds a maximum number.

9. The method as claimed in claim 1, wherein the authentication of the user on the service gateway comprises a two-factor authentication of the user.

10. The method as claimed in claim 1, wherein the method, following successful login of the user on the device, further comprises:
reading historical data of power generation of the power generation plant,
reading parameters of a power generation of the power generation plant, and/or modifying parameters of the power generation of the power generation plant.

11. The method as claimed in claim 10, further comprising modifying the parameters based on the historical data.

12. The method as claimed in claim 10, further comprising modifying the parameters based on data which are received from the device via the data connection between the access device of the user and the device.

13. The method as claimed in claim 10, wherein the historical data are transmitted from the device via the data connection between the access device of the user and the device.

* * * * *